US009628787B2

(12) United States Patent
Gulati et al.

(10) Patent No.: US 9,628,787 B2
(45) Date of Patent: Apr. 18, 2017

(54) ENSURING IMAGING SUBSYSTEM INTEGRITY IN CAMERA BASED SAFETY SYSTEMS (71) Applicant: Texas Instruments Incorporated, Dallas, TX (US)

(72) Inventors: Rahul Gulati, Bangalore (IN); Vasant Easwaran, Bangalore (IN); Mihir Narendra Mody, Bangalore (IN); Prashant Dinkar Karandikar, Pune (IN); Prithvi Y. A. Shankar, Bangalore (IN); Aishwarya Dubey, Plano, TX (US); Kedar Chitnis, Bangalore (IN); Rajat Sagar, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/607,053

(22) Filed: Jan. 27, 2015

(65) Prior Publication Data
US 2015/0304648 A1 Oct. 22, 2015

Related U.S. Application Data (60) Provisional application No. 61/980,280, filed on Apr. 16, 2014.

(51) Int. Cl.
*H04N 17/00* (2006.01)
*H04N 17/02* (2006.01)
*G06T 7/00* (2017.01)

(52) U.S. Cl.
CPC ......... *H04N 17/002* (2013.01); *G06T 7/0002* (2013.01); *G06T 7/0018* (2013.01);
(Continued)

(58) Field of Classification Search
CPC ........ H04N 17/002; H04N 7/18; H04N 17/00; H04N 17/02; G06T 7/0002; G06T 7/0018; G06T 2207/30168; G06T 2207/30252
(Continued)

(56) References Cited

U.S. PATENT DOCUMENTS 6,726,103 B1 * 4/2004 Motta ................. H04N 5/2178
235/454
7,076,101 B2 7/2006 Chung et al.
(Continued)

FOREIGN PATENT DOCUMENTS

CN 101377675 A 7/2009

OTHER PUBLICATIONS

Hussain Al-Asaad, et al, "Online BIST for Embedded Systems", IEEE Design & Test of Computers, vol. 15, Issue 4, Oct.-Dec. 1998, pp. 17-24.
(Continued)

*Primary Examiner* — Trang U Tran
(74) *Attorney, Agent, or Firm* — Lawrence J. Bassuk; Charles A. Brill; Frank D. Cimino (57) ABSTRACT A method for testing an imaging subsystem of a system-on-a-chip (SOC) is provided that includes executing imaging subsystem test software instructions periodically on a processor of the SOC, receiving reference image data in the imaging subsystem responsive to the executing of the test software instructions, performing image signal processing on the reference image data by the imaging subsystem to generate processed reference image data, and using the processed reference image data by the test software instructions to verify whether or not the imaging subsystem is operating correctly.

17 Claims, 4 Drawing Sheets (52) U.S. Cl.
CPC ............... *G06T 2207/30168* (2013.01); *G06T 2207/30252* (2013.01)

(58) Field of Classification Search
USPC ........................................ 348/148, 175, 250
See application file for complete search history.

(56) References Cited

U.S. PATENT DOCUMENTS

| | | | |
|---|---|---|---|
| 7,085,408 B1 | 8/2006 | Chung-Chi Jim | |
| 8,675,076 B2* | 3/2014 | Varga ..................... | H04N 17/04 348/181 |
| 2011/0019006 A1 | 1/2011 | Varga et al. | |
| 2013/0027565 A1* | 1/2013 | Solhusvik .............. | H04N 5/335 348/187 |
| 2014/0200699 A1* | 7/2014 | Vincelli ................ | G06F 11/008 700/105 |
| 2015/0092056 A1* | 4/2015 | Rau ........................ | G08G 1/167 348/148 |
| 2015/0244948 A1* | 8/2015 | Boorom ................. | H04N 5/357 348/241 |

OTHER PUBLICATIONS

Branislav Kisacanin, "Automotive Vision for Advanced Driver Assistance Systems", 2011 International Symposium on VLSI Design Automation and Test (VLSI-DAT), Apr. 25-28, 2011, Hsinchu, Taiwan, pp. 1-2.
Li Chen and Sujit Dey, "Software-Based Self-Testing Methodology for Processor Cores", IEEE Transactions on Computer-Aided Design of Integrated Circuits and Systems, vol. 20, No. 3, Mar. 2001, pp. 369-380.
"OMAP4470 Multimedia Device" Engineering Sample ES1.0, Version A, Data Manual, Literature No. SWPS048A, Texas Instruments, Aug. 2012, Revised Jan. 2013, pp. 1-450.
"Smarter Transport Systems Mean Safer Roads", Road Safety Newsletter No. 8, Directorate-General for Mobility and Transport, European Commission, Mar. 2012, pp. 1-4.
Nektarios Kranitis, et al, "Software-Based Self-Testing of Embedded Processors", IEEE Transactions on Computers, vol. 54, No. 4, Apr. 2005, pp. 461-475.
"A Safety Methodology for ADAS Designs in FPGAs", WP-01204-1.0, White Paper, Altera Corporation, Nov. 2013, p. 1-18.

* cited by examiner

ENSURING IMAGING SUBSYSTEM INTEGRITY IN CAMERA BASED SAFETY SYSTEMS

CROSS-REFERENCE TO RELATED APPLICATIONS

This application claims benefit of U.S. Provisional Patent Application Ser. No. 61/980,280, filed Apr. 16, 2014, which is incorporated herein by reference in its entirety.

BACKGROUND OF THE DISCLOSURE

Field of the Disclosure

Embodiments of the present disclosure generally relate to camera based safety systems, and more specifically relates to ensuring imaging subsystem integrity in camera based safety systems.

Description of the Related Art

Advanced Driver Assistance Systems (ADAS) are one of the fastest-growing application areas in vehicles today. These safety systems have been introduced into automobiles to reduce human operation error. A multitude of features can now warn drivers, allow better visibility into what is going on outside the car, and support features like park assist and adaptive cruise control. The proliferation of ADAS has been enabled in part by improvements in microcontroller and sensor technologies.

Driver assistance systems are required to meet the functional safety specifications of International Standard 26262 (ISO 26262) titled "Road Vehicles—Functional Safety." ISO 26262 defines functional safety as the absence of unreasonable risk caused by malfunctioning behavior of electrical/electronic systems. Functional safety in a driver assistance system is the prevention of harm to humans due to failure of components in the system.

To support the functional safety requirements of ISO 26262, a comprehensive self-test strategy is needed to guarantee safe operation and/or safe operational degradation of hardware and software components of an ADAS throughout its life cycle. Software based self-tests have been proposed as an effective alternative to hardware based self tests in order to eliminate reduce the silicon area needed to support the self tests in the underlying ADAS hardware.

SUMMARY

Embodiments of the present disclosure relate to methods, apparatus, and computer readable media for ensuring imaging subsystem integrity in a camera based safety system. In one aspect, a method for testing an imaging subsystem of a system-on-a-chip (SOC) is provided that includes executing imaging subsystem test software instructions periodically on a processor of the SOC, receiving reference image data in the imaging subsystem responsive to the executing of the test software instructions, performing image signal processing on the reference image data by the imaging subsystem to generate processed reference image data, and using the processed reference image data by the test software instructions to verify whether or not the imaging subsystem is operating correctly.

In one aspect, a camera based system-on-a-chip (SOC) is provided that includes a memory storing test software instructions, a processor coupled to the memory to periodically execute the test software instructions to verify correct operation of an imaging subsystem, in which processed reference image data generated by the imaging subsystem is used, and the imaging subsystem coupled to the processor in which, responsive to execution of the test software instructions, reference image data is received and processed to generate the processed reference image data.

In one aspect, a non-transitory computer readable medium storing test software instructions is provided. The test software instructions, when executed periodically by a processor of a camera based SOC, cause a method for testing an imaging subsystem of the SOC to be performed, the method including receiving reference image data in the imaging subsystem responsive to the executing of the test software instructions, performing image signal processing on the reference image data by the imaging subsystem to generate processed reference image data, and using the processed reference image data by the test software instructions to verify whether or not the imaging subsystem is operating correctly.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Specific embodiments of the disclosure will now be described in detail with reference to the accompanying figures. Like elements in the various figures are denoted by like reference numerals for consistency.

Figure 1:
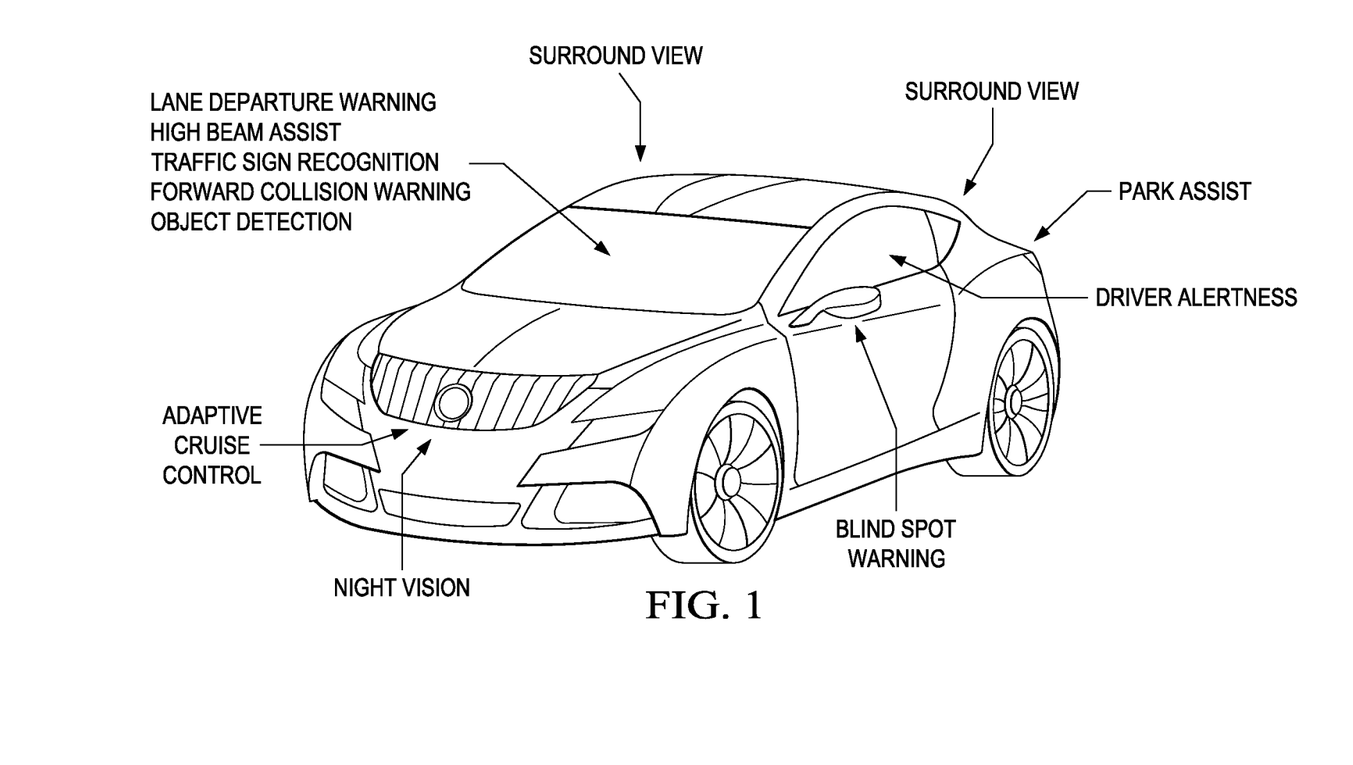
FIG. 1 is an example illustrating some camera based Advanced Driver Assistance Systems (ADAS) in a vehicle.

Many driver assistance systems rely on highly complex computer vision algorithms applied to video streams captured by cameras installed in various locations in the vehicle. FIG. 1 illustrates some examples of computer vision based driver assistance systems. Such camera based driver assistance systems need to meet the functional safety requirements specified in ISO 26262 for road vehicles weighing up to 3.5 tons.

The ISO 26262 standard defines functional safety for automotive equipment applicable throughout the lifecycle of all automotive electronic and electrical safety-related systems. ISO 26262 is a risk-based safety standard in which the risk of hazardous operational situations is qualitatively assessed. ISO 26262 defines safety measures to avoid or control systematic failures, and to detect or control random hardware failures or mitigate the effects of such. The standard covers functional safety aspects of the entire development process of all automotive electronic and electrical safety-related systems, including, for example, requirements specification, design, implementation, integration, verification, validation and configuration. Further, the standard provides requirements for validation and confirmation measures to ensure a sufficient and acceptable level of safety is being achieved. Such requirements include ensuring correct functioning of a system during operation in a vehicle, which may be achieved using hardware and/or software self tests.

Embodiments of the disclosure provide for software-based self test of imaging subsystems in camera-based safety systems such as Advanced Driver Assistance Systems (ADAS). On-line (while the system is in being used in a vehicle) self tests in ADAS may be performed using hardware self-test approaches and/or software-based self test approaches. Software-based self-test approaches are generally less intrusive than hardware self test approaches as the software-based self tests may be applied during the normal operation mode of the ADAS.

Embodiments of the disclosure provide for time-triggered non-concurrent testing, i.e., periodic testing, of an imaging subsystem that may be performed in addition to event triggered non-concurrent online tests that may be initiated by key events such as system start-up or shut down. While event triggered self-test mechanisms help to detect permanent faults, time-triggered periodic self-tests such as those described herein help to detect intermittent faults as well as permanent faults during operation. Additionally, any latent design faults that may appear only under certain operating conditions may be identified by periodic self-tests.

Figure 2:
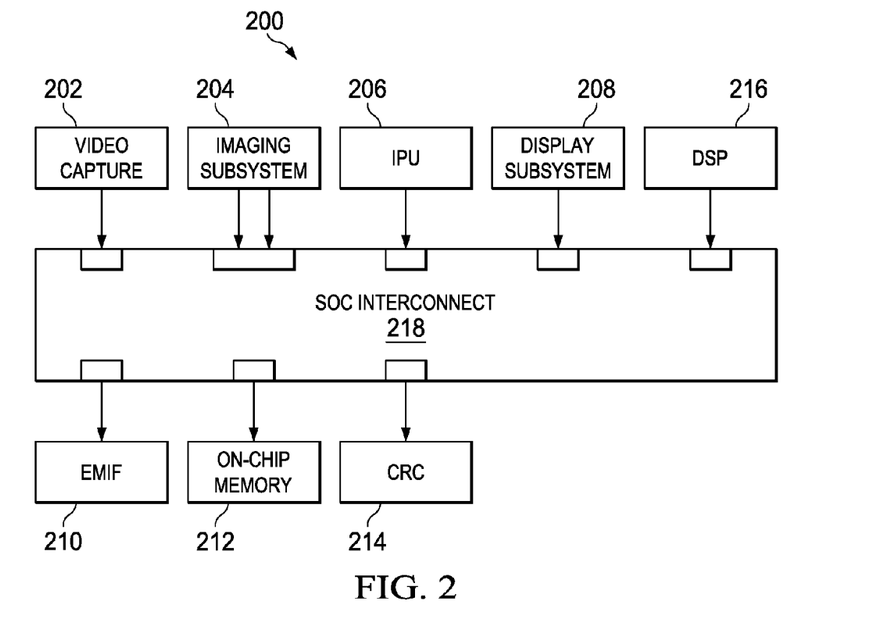
FIG. 2 is a block diagram of an example ADAS camera based system-on-a-chip (SOC)

FIG. 2 is a simplified block diagram of an example camera based system-on-a-chip (SOC) 200. This example system-on-a-chip (SoC) is representative of one of a family of OMAP™ processors available from Texas Instruments, Inc. This SoC is described in more detail in "OMAP543x Multimedia Device Silicon Revision 2.0", SWPU249AC, May 2013, revised December 2014.

The SOC 200 includes a video capture component 202, an imaging subsystem 204, an image processing unit (IPU) subsystem 206, a display subsystem 208, an external memory interface (EMIF) 210, on-chip memory 212, a cyclic redundancy check (CRC) component 214 and a digital signal processing unit (DSP) subsystem 216 coupled via a high speed interconnect 218. The video capture component 202 provides an interface for video capture from an imaging peripheral such as an external camera. The video capture component 202 may include functionality to, for example, receive an analog video stream from an imaging peripheral, convert the analog stream to a digital video stream, and divide the digital video stream into frames of image data. The imaging subsystem 204 includes functionality to perform image signal processing on the frames of image data generated by the video capture component 202. The imaging subsystem 204 is described in more detail in reference to FIGS. 3 and 4.

The IPU subsystem 206 includes functionality to configure and control the imaging subsystem 204. More specifically, the IPU subsystem 206 drives the imaging subsystem 204 and includes functionality to, for example, program registers of the imaging subsystem 204, sequence operations performed by the subsystem 204, manage the input and output buffers of the subsystem 204. The IPU subsystem 206 further includes functionality to control the software self-test of the imaging subsystem 204. This functionality is described in more detail in reference to the method of FIG. 5.

The CRC component 214 includes functionality to perform 32-ibit CRC computations for verifying that software executed on the SOC 200 and any stored data used by such software has not been corrupted. In some embodiments, as is explained in more detail in reference to FIG. 5, the CRC component 214 is used during the software self-test of the imaging subsystem 204.

In some embodiments, the DSP subsystem 216 includes functionality to perform a 64 bit CRC computation on a frame of image data. As is explained in more detail in reference to FIG. 5, the DSP subsystem 216 may be used during the software self-test of the imaging subsystem 204.

The EMIF 210 provides an interface between components of the SOC 200 and external memory. The display subsystem 208 includes functionality for displaying processed video frames from the imaging subsystem 204 on an external display device, e.g., functionality to format each frame in the format expected by the external display device.

The on-chip memory component 212 provides on-chip storage, e.g., a computer readable medium, that may be used, for example, to communicate data between the various components, to store software programs executed by the imaging subsystem 204 or the IPU 206 or the DSP 216, etc. The on-chip memory component 212 may include any suitable combination of read-only memory and/or random access memory.

Figure 3:
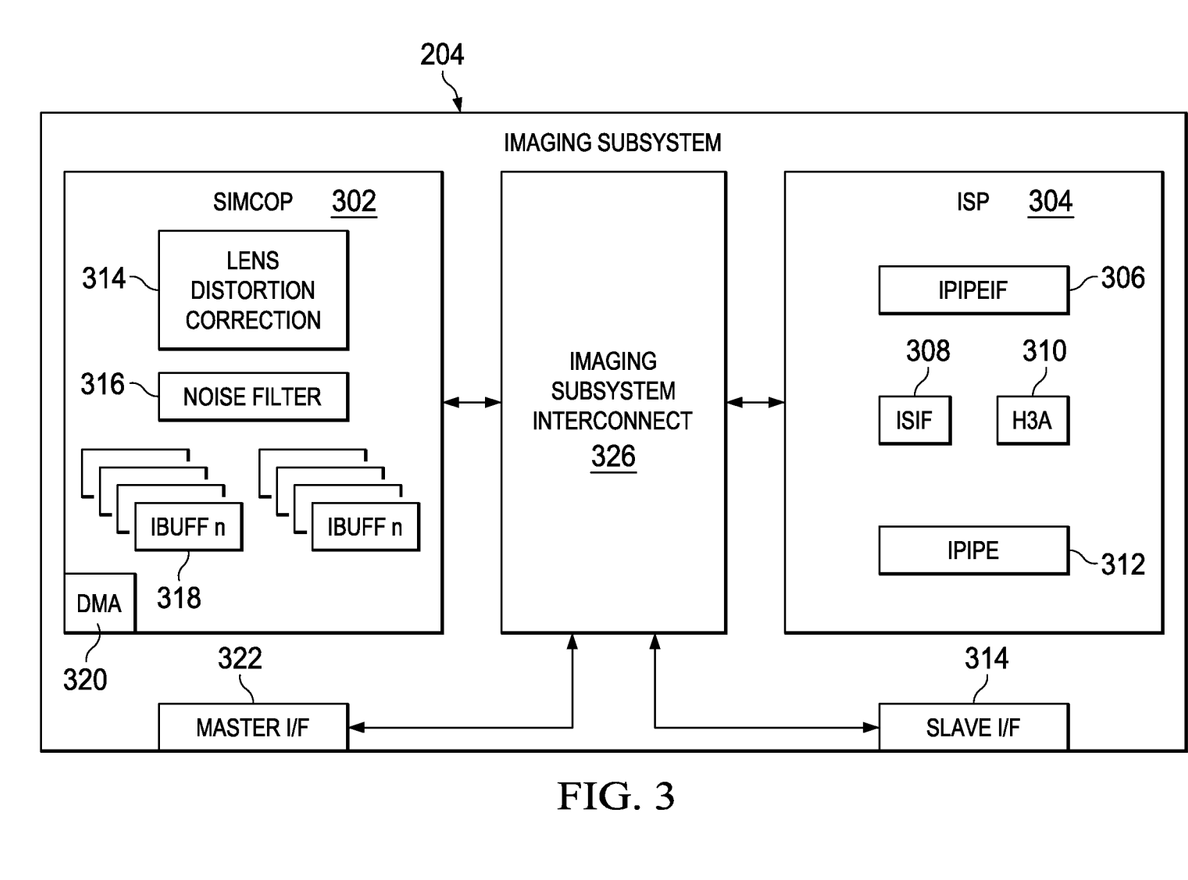
FIG. 3 is a block diagram of an example imaging subsystem in an ADAS computer vision SOC.

FIG. 3 is a simplified block diagram of the imaging subsystem 204 of FIG. 2. In general, the imaging subsystem 204 includes functionality to perform image processing operations such as, for example, black level adjustment, noise filtering, white balance, RGB blending, gamma correction, RGB to YcbCr conversion, and edge enhancement. The imaging subsystem 204 includes a still image co-processor (SIMCOP) 302, an image signal processor (ISP) 304, and master and slave interfaces 322, 324 coupled via a local interconnect 326. The master interface 322 may be used to initiate transfers from within the imaging subsystem 204 to external entities such as external memory, on-chip memory, etc. The slave interface 324 may be used by other on-chip components such as the IPU 206 to access portions of the imaging subsystem 204 such as registers, etc.

The SIMCOP 302 includes functionality to encode, decode, and process image data. The SIMCOP 302 performs block-based memory-to-memory processing in which blocks of data are fetched from system memory and stored in local memory. Different accelerators in the SIMCOP 302 process the fetched blocks and store the processed blocks back in the local memory for further processing by other accelerators and/or to be returned to system memory. The accelerators may include a discrete cosine transform (DCT) module (not shown), an encoder/decoder module (not shown), a rotation accelerator engine (not shown), a lens distortion correction module 314 that corrects lens geometric distortion issues in the external camera, and a noise filter module 316. The SIMCOP 302 also includes a direct memory access (DMA) controller 320 for data transfers to and from SIMCOP local memory to system memory and various buffers 318. The buffers 318 may be used to store frames of image data that have been processed by the imaging subsystem 204.

The ISP 304 includes functionality to perform image processing functions on incoming video data and statistical data collection for auto exposure, auto white balance, auto focus, and video stabilization. The ISP 304 includes an image sensor interface (ISIF) module 308, an image pipe (IPIPE) module 312, an IPIPE interface (IPIPEIF) module 306, and a hardware 3A (H3A) module 310. The ISP 304 also includes a video port (not shown) for interfacing with the video capture component 202. The IPIPEIF module 306 provides data and synchronization signals to other modules in the ISP 304. Data sources include the video port, the ISIF module 308, and memory.

The IPIPE module 310 includes functionality to perform various image processing functions on image data. The IPIPE module is described in more detail in reference to FIG. 4. The H3A module 310 supports the control loops for auto focus, auto white balance, and auto exposure by collection metrics about the image data. These metrics are used to adjust parameters for processing the image data. The ISIF module 308 receives image data from the IPIPEIF module 306 and includes functionality to perform, for example, sensor data linearization, color space conversion, vertical line defect correction, etc.

Figure 4:
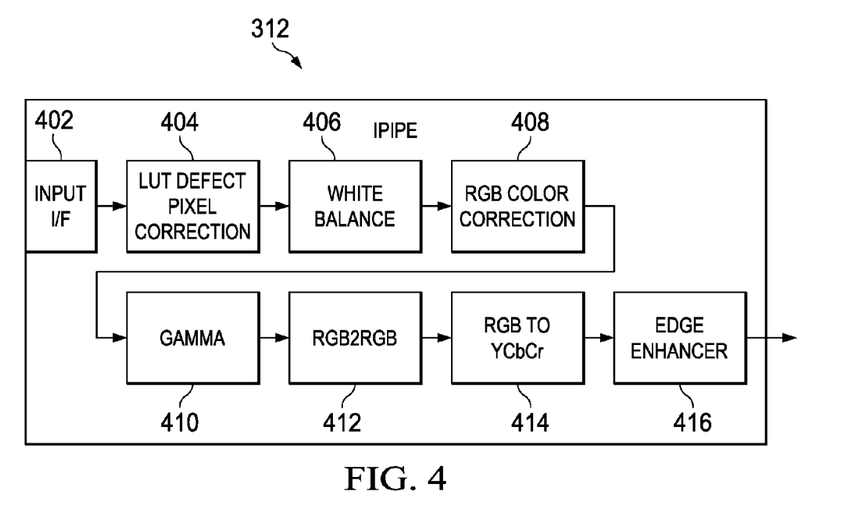
FIG. 4 is a block diagram of the imaging processing pipeline of the imaging subsystem of FIG. 3.

FIG. 4 is a simplified block diagram of the IPIPE module 310 of FIG. 3. The IPIPE module 310 is a programmable hardware image processing module that generates image data in YCbCr format from raw image data. As depicted in FIG. 4, the IPIPE module 310 includes an interface 402 for receiving the raw image data from the IPIPEIF module 306, a defect pixel correction module 404, a white balance module 404, an RGB color correction module 408, a gamma correction module 410, an RGB2RGB module 412, an RGB to YCbCr conversion module 414, and an edge enhancer module 416. The modules are coupled in series to perform the image processing in a pipeline fashion.

The defect pixel correction module 404 includes functionality to perform look-up table (LUT) based correction of defective pixels in the input data. The white balance module 404 includes functionality to white balance each color component of the input data. The RGB color correction module 408 (sometimes referred to as a color filter array (CFA) interpolation module) includes functionality to interpolate missing color components for each pixel based on available color components and color components of neighboring pixels. The gamma correction module 410 includes functionality to compensate for the nonlinearity of relative intensity of a display by performing gamma correction for each color in the RGB color space using a table-based piece-wise linear function.

The RGB2RGB module 412 includes functionality to compensate for the fact that different imaging sensor produce different RGB value for the same color by applying a blending matrix to the image data to convert the sensor RGB color space to a standard RGB color space. The RGB to YCbCr conversion module 414 includes functionality to convert the image data from RGB format to YCbCr format. The edge enhancer module 416 includes functionality to operate on the luminance (Y data) components of pixels to improve image quality. Edges in the input images are detected by a high-pass filter, and the sharpness increased by a value from a nonlinear table.

Figure 5:
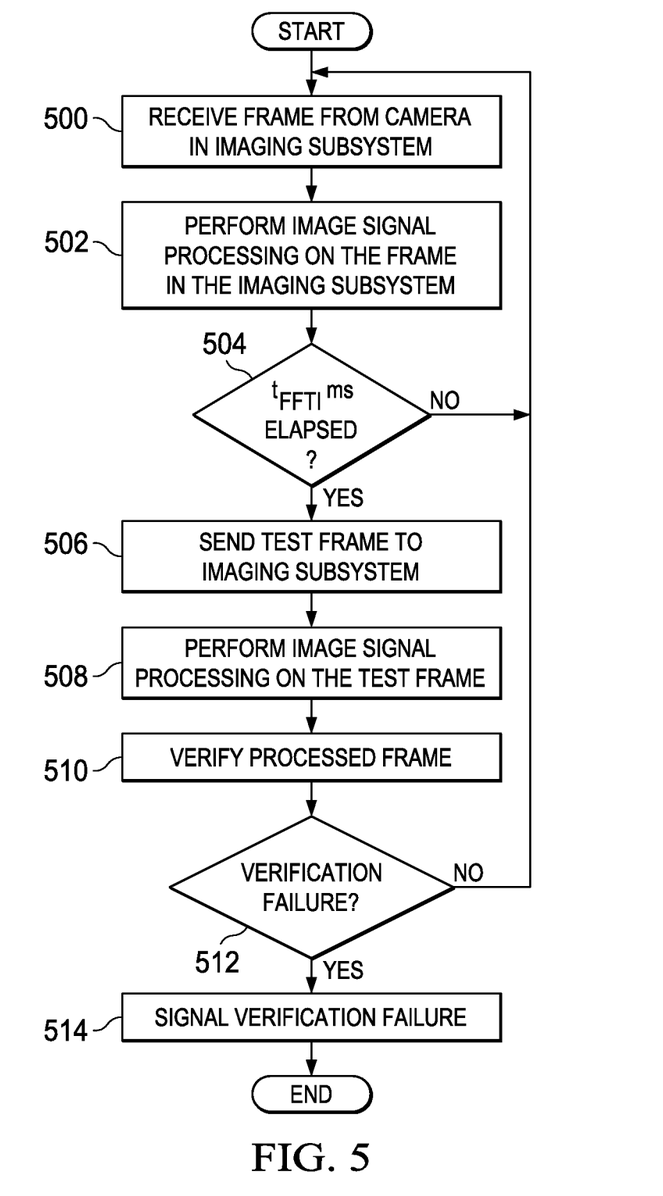
FIG. 5 is a flow diagram of a method for software self test of an imaging subsystem in an ADAS camera based SOC.

FIG. 5 is a flow diagram of a method for software self test of an imaging subsystem in an ADAS camera based SOC such as that of FIGS. 2-4. The method is based on having reference image data, i.e., a test frame or series of test frames that is periodically processed by the imaging subsystem to check the performance of the subsystem. For simplicity of explanation, the method is described assuming that a single test frame is used. One of ordinary skill in the art will understand embodiments in which more than one test frame may be used, such as when a single test frame does not provide sufficient test coverage of the imaging subsystem. The reference image data is processed by the imaging subsystem once every fault tolerant time interval (FTTI) as the driver assistance system is operating in a vehicle. An FTTI is the time span in which a fault can be present in a system before functional safety is comprised, e.g., before a hazardous event occurs. ISO 26262 defines the FTTIs for ADAS applications which vary from 70 milliseconds (ms) to approximately 500 ms depending on the application.

The achievable diagnostic coverage of the imaging subsystem by the test frame is dependent on the pixel data in the test frame. Ideally, the pixel data in the test frame is chosen to ensure that all components of the imaging subsystem are exercised. Some criteria to be considered in generating a test frame are now discussed. Referring to FIGS. 2 and 4, several modules in the imaging subsystem 204 can be broadly classified into three categories: look-up table based processing modules such as the defect pixel correction module 404, multiply and add (MAC) based processing modules such as the RGB2RGB module 412, and modules that are responsible for conditional processing based on threshold values such as the edge enhancer module 416. This information is critical to test frame generation to insure appropriate diagnostic coverage of the imaging subsystem.

In general, the range of LUT entries is known. For a LUT based module, care should be taken to ensure that the pixel data in the test frame exercises a majority of input combinations which in turn results in exercising a majority of output combinations for a particular LUT. For MAC based processing modules, the content of the test frame should ensure that multiply and add values will be chosen to cover any potential stuck faults in data lines used in the MAC operations.

Data for the test frame may be derived, for example, from test data used to verify system integrity in formal design testing and manufacturing testing. Further, the test frame may be static, i.e., completely generated off-line and stored non-volatile memory on the SOC or may be partially static such that some parts are generated off-line and other parts are automatically generated when the SOC is booted. For example, portions of the test frame that test input/output combinations of LUTs could be automatically generated.

Referring again to FIG. 5, a frame of image data is received 500 in the imaging subsystem and image signal processing is performed 502 on the frame. The receiving and processing may continue until $t_{FTTI}$ milliseconds (ms) have elapsed 504 since the last self test. When $t_{FTTI}$ ms have elapsed 504 since the last self test, the test frame is sent 506 to the imaging subsystem. The test frame is processed 508 by the imaging subsystem and the resulting processed frame is verified 512. The verification may be performed, for example, by computing a CRC value for the processed frame and comparing the computed CRC value to an expected CRC value. If the two CRC values are the same, the integrity of the imaging subsystem is still good and operation continues. Otherwise, a signal 514 is generated indicating that the imaging subsystem is failing. The ADAS application may then take appropriate action to recover from the failure such as restarting the SOC or disregarding processed frames from the imaging subsystem.

For example, referring to the SOC 200 of FIG. 2, the imaging subsystem 204 operating under the control of the IPU 206, receives one frame at a time from the video capture component 202 and performs image signal processing on the frame. The receiving and processing of frames continues until the IPU 206 receives a timer interrupt, which occurs each $t_{FTTI}$ ms. In response to this interrupt, the IPU 206 initiates execution of software to perform a self test on the imaging subsystem 204. The self test software causes the IPU 206 to send the test frame to the imaging subsystem 204 and causes the imaging subsystem to perform image signal processing on the test frame.

The self test software on the IPU 206 receives the resulting processed test frame and causes a CRC value to be computed on the processed frame. In some embodiments, the self test software on the IPU 206 provides the processed frame to the CRC component 214 for this computation. In some embodiments, the self test software on the IPU 206 provides the processed frame to the DSP 216 for this computation. The self test software on the IPU 206 receives the computed CRC value and compares it to the expected CRC value. If the two values match, the imaging subsystem 204 is deemed to be operating successfully and processing of incoming frames is resumed. Otherwise, the self test software causes a verification failure to be signaled.

The execution of the self-test does not interfere with the expected output of the imaging subsystem 204 as the imaging subsystem 204 operates at a higher frame rate than the camera providing the frames to be processed. For example, the imaging subsystem 204 may operate at 60 frames per second while the camera operates at 45 frames per second. Some or all of the time period for the unused 15 frames may be used for processing the test frame.

In general, the software self-test is executed every ith frame to insure the integrity of the imaging subsystem, where the value of i depends on the particular FTTI of the ADAS application. The value of i is determined as per $$i = \left\lfloor \left( \frac{t_{FTTI} * N}{1000} \right) \right\rfloor - 1$$

where N is the number of frames per second processed by the imaging subsystem and $t_{FTTI}$ is the defined fault tolerant time interval in milliseconds. Thus, if the imaging subsystem runs at a frequency $f_{orig}$, the additional clocking requirement $f_{ISS}$ to support the self-test is given by $$f_{ISS} = f_{orig} * \left(1 + \left(\frac{1}{i-1}\right)\right).$$

Further, if the test data is coming from external memory, there is an additional clocking requirement. For a test ADAS application with an FTTI of 300 ms and a 1080p30 YUV422 input capture, diagnostic coverage of greater than 90% was achieved through a test frame processed every eight frames of captured input at the cost of an approximate 13% increase in external memory bandwidth/clocking requirement and a 1.125 increase in clocking requirements for the imaging subsystem.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, while embodiments have been described herein in the context of driver assistance systems in vehicles, one of ordinary skill in the art will understand embodiments for other types of camera based safety systems, e.g., in industrial and manufacturing applications. In such embodiments, the FTTI may be defined by a standard for the particular application type, by a user, etc.

In another example, one of ordinary skill in the art will understand embodiments in which a processor other than the IPU executes some or all of the software self test instructions.

The self test software instructions for an imaging subsystem may be initially stored in a computer-readable medium and loaded and executed by a processor. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in radar systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A method for testing an imaging subsystem of a system-on a-chip (SOC), the method comprising:
   executing imaging subsystem test software instructions, stored in an on-chip memory of the SOC, periodically on a processor of the SOC;
   receiving reference image data in the imaging subsystem responsive to the executing of the test software instructions;
   performing image signal processing on the reference image data by the imaging subsystem to generate processed reference image data; and
   using the processed reference image data by the test software instructions to verify whether or not the imaging subsystem is operating correctly, in which executing imaging subsystem test software instructions periodically includes executing the imaging subsystem test software instructions at fault tolerant time intervals;
   in which using the processed reference image data includes computing a cyclic redundancy check (CRC) value for the processed reference image data and comparing the computed CRC value to an expected CRC value.

2. The method of claim 1, in which executing imaging subsystem test software instructions is performed responsive to a timer interrupt.

3. The method of claim 1, in which the reference image data is a single test frame.

4. The method of claim 1, in which the processor is an image processing unit.

5. The method of claim 1, in which the SOC is operating in a driver assistance system.

6. A camera based system-on-a-chip (SOC) comprising:
   an on-chip memory storing test software instructions;

a processor coupled to the memory to periodically execute the test software instructions to verify correct operation of an imaging subsystem, in which processed reference image data generated by the imaging subsystem is used; and the imaging subsystem coupled to the processor in which, responsive to execution of the test software instructions, reference image data is received and processed to generate the processed reference image data, in which the processor executes the test software instructions periodically at fault tolerant time intervals;

in which the test software instructions compare a computed cyclic redundancy check (CRC) value for the processed reference image data to an expected CRC value to verify whether or not the imaging system is operating correctly.

7. The camera based SOC of claim 6, in which the processor executes the test software instructions responsive to a timer interrupt.

8. The camera based SOC of claim 6, in which the reference image data is a single test frame.

9. The camera based SOC of claim 6, in which the processor is an image processing unit.

10. The camera based SOC of claim 6, in which the SOC is included in a driver assistance system.

11. A non-transitory computer readable medium storing test software instructions that cause a method for testing an imaging subsystem of a camera based SOC to be performed, the method comprising:

executing test software instructions, stored in an on-chip memory of the SOC, periodically on a processor of the SOC;

receiving reference image data in the imaging subsystem responsive to the executing of the test software instructions;

performing image signal processing on the reference image data by the imaging subsystem to generate processed reference image data; and using the processed reference image data by the test software instructions to verify whether or not the imaging subsystem is operating correctly, in which the imaging subsystem test software instructions are executed periodically at fault tolerant time intervals;

in which using the processed reference image data includes computing a cyclic redundancy check (CRC) value for the processed reference image data and comparing the computed CRC value to an expected CRC value.

12. The non-transitory computer readable medium of claim 11, in which the imaging subsystem test software instructions are executed responsive to a timer interrupt.

13. The non-transitory computer readable medium of claim 11, in which the reference image data is a single test frame.

14. The non-transitory computer readable medium of claim 11, in which the processor is an image processing unit.

15. A method for testing an imaging subsystem of a system-on a-chip (SOC), the method comprising:

executing imaging subsystem test software instructions, stored in an on-chip memory of the SOC, on a processor of the SOC periodically at fault tolerant time intervals;

receiving reference image data, from a non-volatile memory on the SOC, in the imaging subsystem responsive to the executing of the test software instructions;

performing image signal processing on the reference image data by the imaging subsystem to generate processed reference image data; and computing a cyclic redundancy check (CRC) value for the processed reference image data and comparing the computed CRC value to an expected CRC value to verify whether or not the imaging system is operating correctly.

16. The method of claim 15, in which the SOC is operating in a driver assistance system.

17. The method of claim 15, in which the reference image data is a single test frame.

\* \* \* \* \*